US011138535B2

(12) United States Patent
Parees et al.

(10) Patent No.: US 11,138,535 B2
(45) Date of Patent: Oct. 5, 2021

(54) DEVELOPING WORKFLOW-BASED RECOMMENDATIONS BASED ON ORGANIZATIONAL PATTERNS AND OBSERVED BEHAVIOR

(71) Applicant: Red Hat, Inc., Raleigh, NC (US)

(72) Inventors: Benjamin Michael Parees, Durham, NC (US); Clayton Palmer Coleman, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/901,616

(22) Filed: Feb. 21, 2018

(65) Prior Publication Data

US 2019/0258976 A1    Aug. 22, 2019

(51) Int. Cl.
*G06F 9/44* (2018.01)
*G06Q 10/06* (2012.01)
*G06F 8/20* (2018.01)

(52) U.S. Cl.
CPC ......... *G06Q 10/06313* (2013.01); *G06F 8/20* (2013.01)

(58) Field of Classification Search
CPC ............................ G06Q 10/06313; G06F 8/20
USPC .................................................. 717/100–120
See application file for complete search history.

(56) References Cited

U.S. PATENT DOCUMENTS

| 8,589,882 | B2 | 11/2013 | Shochat et al. |
| 9,348,739 | B2 | 5/2016 | Krishna et al. |
| 9,495,207 | B1* | 11/2016 | Pjesivac-Grbovic ... G06F 9/546 |
| 9,787,779 | B2 | 10/2017 | Frank et al. |
| 2006/0095894 | A1* | 5/2006 | Wilde .................. G06F 9/3851 717/113 |
| 2014/0229221 | A1* | 8/2014 | Shih ................. G06Q 10/06312 705/7.23 |
| 2015/0242200 | A1 | 8/2015 | Niemoeller et al. |
| 2017/0163732 | A1 | 7/2017 | Saraf et al. |
| 2017/0242667 | A1 | 8/2017 | Kotman et al. |
| 2019/0196795 | A1* | 6/2019 | Cavalier ............. G06F 9/45512 |

OTHER PUBLICATIONS

Shibaji Debnath, "Benefits of Design Patterns in Application Developments", Published on Dec. 6, 2015; https://www.linkedin.com/pulse/benefits-design-patterns-application-development-shibaji-debnath; Accessed Date: Dec. 29, 2017; (3 Pages).

* cited by examiner

*Primary Examiner* — Chuck O Kendall
(74) *Attorney, Agent, or Firm* — K&L Gates LLP

(57) ABSTRACT

A pipeline object recommendation system may be configured to analyze a software development project for development attributes. The system may then generate a pipeline object corresponding to the development project based on the plurality of development attributes. The system may then present the pipeline object.

19 Claims, 6 Drawing Sheets

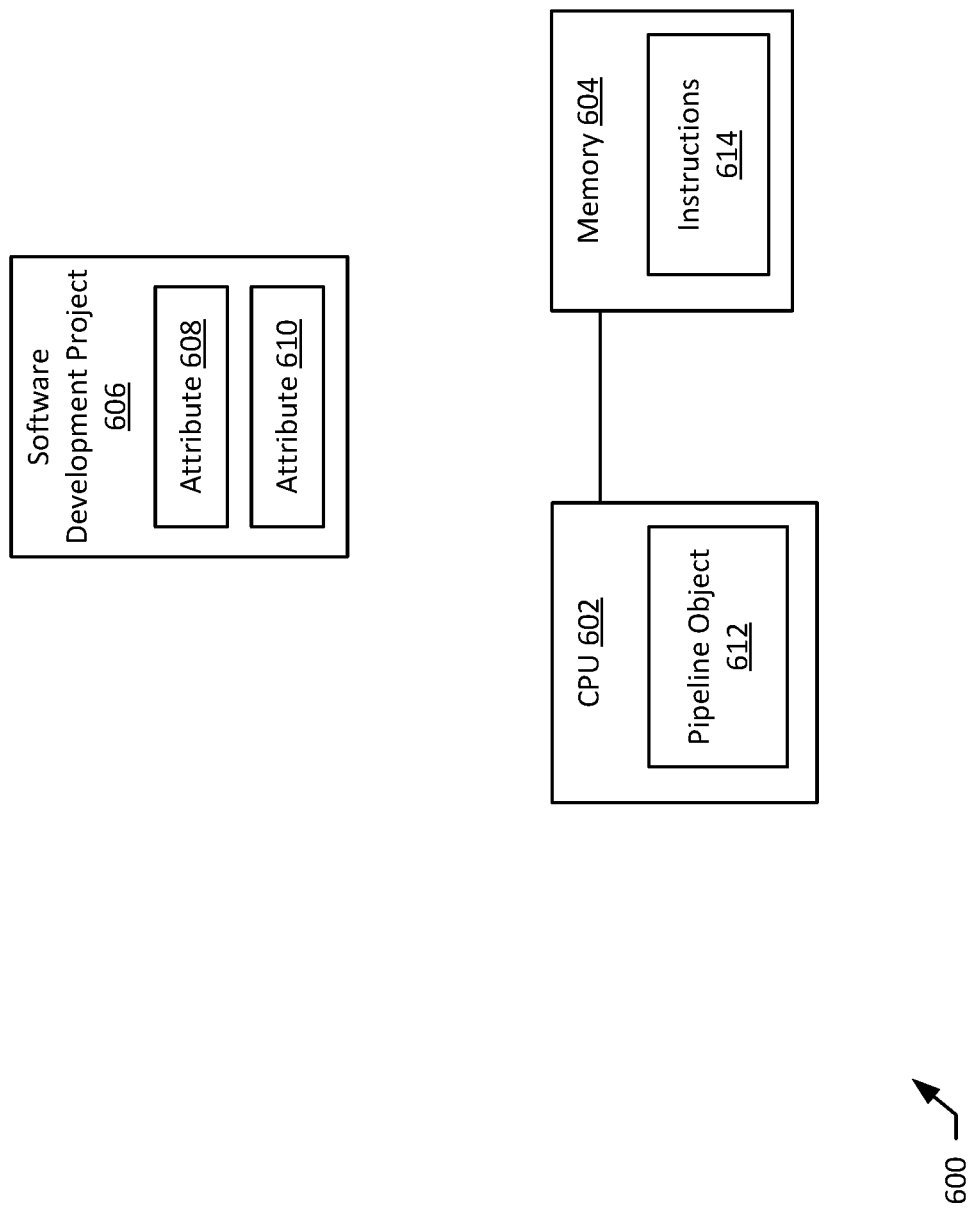

20

DEVELOPING WORKFLOW-BASED RECOMMENDATIONS BASED ON ORGANIZATIONAL PATTERNS AND OBSERVED BEHAVIOR

BACKGROUND

Defining a software development project's workflow is an important aspect of any continuous integration software development project. These workflows often include sets of development tasks, testing tasks, and deployment tasks necessary for the project to be built, compiled, and tested. Defining these workflows early in a project's development enables other people to integrate with the project and ensures that the project is built, tested, and deployed in the same way every time.

SUMMARY

The present disclosure presents new and innovative systems and methods for generating pipeline object recommendations for software development projects. In an example, a system contains a processor and a memory communicatively coupled to the processor. The memory contains instructions that, when executed by the processor, cause the processor to analyze a software development project for a plurality of development attributes. The memory contains further instructions that, when executed by the processor, cause the processor to generate a pipeline object corresponding to the software development project based on the plurality of development attributes and present the pipeline object.

In another example, a method includes analyzing a software development project for a plurality of development attributes. The method further includes generating a pipeline object corresponding to the software development project based on the plurality of development attributes and presenting the pipeline object.

In a third example, a computer readable medium stores instructions which, when executed by one or more processors, cause the one or more processors to analyze a software development project for a development attribute. The computer readable medium stores further instructions which, when executed by one or more processors, cause the one or more processors to generate a pipeline object corresponding to the development project based on the plurality of development attribute; and present the pipeline object.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 6 illustrates a block diagram of an example system according to an example embodiment of the present disclosure.

DETAILED DESCRIPTION OF EXAMPLE EMBODIMENTS

Workflows may be implemented as pipeline objects that further ease the development process by automating many workflow tasks. However, these pipeline objects must often be created from scratch using systems such as Jenkins, the Apache Groovy language, TeamCity, Bamboo, and others. In defining these workflows, developers make subjective decisions regarding which workflow tasks should be included. Defining workflows in this manner risks wasting developer time defining workflows similar to workflows used in other software development projects. Subjectively-defined workflows also risk excluding workflow tasks that may be helpful to automate, or may include workflow tasks that should be excluded due to errors in the subjective decision-making process.

As described in the examples below, one way to solve this problem is to provide a centralized resource to recommend pipeline objects to developers based on the attributes of their development projects. One aspect of doing this may be a centralized database of pipeline objects from other development projects. New development projects may then be compared with the other development projects, and a pipeline object may be selected from the projects that most closely resemble the new project. Another aspect of making these recommendations is to analyze the actions developers take when creating and testing the development project and generating a pipeline object based on these monitored actions. These two strategies may be used separately or combined.

Figure 1:
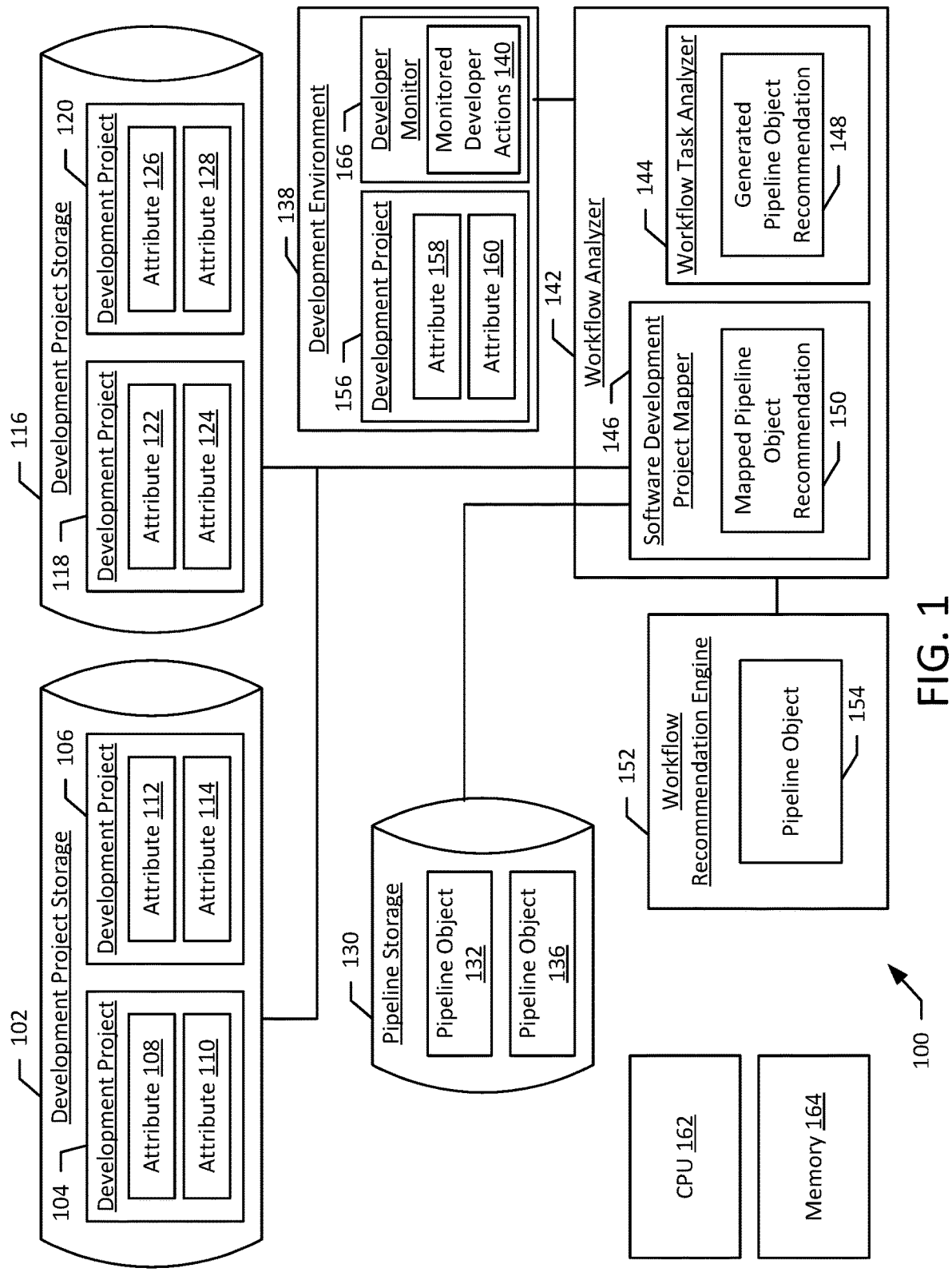
FIG. 1 illustrates a block diagram of a computing system according to an example embodiment of the present disclosure.

FIG. 1 depicts a block diagram of an example computing system 100 according to an exemplary embodiment of the present disclosure. The system 100 includes a workflow analyzer 142, a development environment 138, and a workflow recommendation engine 152. The workflow analyzer 142 includes a software development project mapper 146 connected to development project storages 102, 116 and pipeline storage 130. The workflow analyzer 142 further includes a workflow task analyzer 144. The workflow analyzer 142 is connected to both the development environment 138 and the workflow recommendation engine 152. The system 100 further includes a CPU 162 and a memory 164.

The development project storage 102 may be configured to store a plurality of development projects and their corresponding development attributes. For example, development project storage 102 contains development projects 104, 106. These development projects 104, 106 may be current or former projects being developed by one or more development teams within an organization and may be tied to particular continuous development workflows. The development project storage 102 may execute on the CPU 162 and the memory 164.

Each development project 104, 106 may contain development attributes. These development attributes may include one or more items describing the development project 104, 106, the development team or teams working on the project, or the workflows used in the project. For example, the development attributes 108, 110, 112, 114 may include dependency pull-down actions, build actions, compile actions, test actions, development tools, programming languages, makefile similarities, source code managers, and associated employees. Exemplary development attributes would include that the development project is programmed in Java, that the development project depends on a particular Java library, or that the development project uses the Maven or Gradle Java development applications. The development attributes 108, 110, 112, 114 may be stored within the development projects themselves, or may be stored elsewhere in the development project storage 102. For example, the development attributes 108, 110, 112, 114 may be stored in a development project attribute table or as metadata corresponding to the development project 104, 106.

Further, the system 100 may include more than one development project storage. For example, FIG. 1 also includes development project storage 116, containing development projects 118 and 120 and respective development attributes 122, 124, 126, and 128. The additional development project storages may be used to store projects from a separate department or business unit, or may be implemented to improve system performance.

The pipeline storage 130 contains pipeline objects 132, 136. The pipeline objects may be used to automate one or more workflow tasks. The pipeline objects 132, 136 may correspond to one or more development projects. For example, pipeline object 132 may correspond to development project 104 and pipeline object 136 may correspond to development project 106. In some examples, the pipeline storage 130 may be used to store production copies of pipeline objects. In other examples, the pipeline storage 130 may be used to store backup or reference copies of the pipeline objects. Pipeline objects are described in greater detail below with reference to FIG. 2.

The development environment 138 includes the development project 156 and the developer monitor 166. The development project 156 may be the development project for which a pipeline object recommendation is being generated. The development project 156 contains development attributes 158, 160, which may be implemented similarly to the development attributes 108, 110, 112, 114 discussed above regarding the development project storage 102. The development project 156 may be a new development project, separate from any development project stored on the development project storage 130. Alternatively, the development project 156 may correspond to or be a copy of a development project stored on the development project storage, such as development project 104 or 106.

The developer monitor 166 may monitor the developer's actions while working on the development project 156 and record them as monitored developer actions 140 in order to ascertain relevant actions to the workflow recommendation process. The monitored developer actions 140 may include dependency pull down actions, build actions, compile actions, and test actions. The developer environment 138 may be implemented as an integrated development environment (IDE) such as Eclipse Che. One advantageous way of implementing the features of the developer monitor 166 may be to create a plugin for an IDE that monitors the developer's actions.

The workflow analyzer 142 includes the software development project mapper 146 and the workflow task analyzer 144. The software development project mapper 146 may compare the development attributes 158 and 160 with the attributes of one or more of the development projects 104, 106, 118, 120 stored in the development project storage 102, 116. The software development project mapper 146 may determine that the development project 156 has matching development attributes with one or more of the development projects 104, 106, 118, 120 stored in the development project storages 102, 116. The matching development attributes may include an overlap or similarity between one or more of the development attributes 158, 160 and the development attributes of a project stored in the development project storage. For example, a project with matching attributes may use the same programming language, similar development tools, have a similar makefile or dockerfile, use the same source code manager, have source code in the same location, or have similar employees associated with it. The project with matching attributes may also have similar workflow actions, such as dependency pull-down actions, build actions, compile actions, or test actions. The software development project mapper 146 may then generate a mapped pipeline object recommendation 150 based on the project with matching attributes. The mapped pipeline object recommendation 150 may include pipeline objects, for example from the pipeline storage 130, that correspond to the development projects with matching attributes. The mapped pipeline object recommendation 150 may include more than one pipeline object, each of which may correspond to a different development project with matching attributes.

The workflow task analyzer 144 may analyze the monitored developer actions 140 for workflow tasks and convert the workflow tasks into a generated pipeline object recommendation 148. The workflow tasks may include dependency pull-down actions, build actions, compile actions, and test actions.

Although the workflow analyzer 142 is depicted as including both the software development project mapper 146 and the workflow task analyzer 144, certain examples may only include one or the other. For example, the workflow analyzer 142 may only include the workflow task analyzer 144.

The workflow recommendation engine 152 may analyze one or both of the mapped pipeline object recommendation 150 and the generated pipeline object recommendation 148 to generate a pipeline object 154.

In certain examples, the workflow recommendation engine 152 may heuristically select a pipeline object contained within mapped pipeline object recommendation 150 and the generated pipeline object recommendation 148. In other exemplary embodiments, the workflow recommendation engine 152 may combine portions of the mapped pipeline object recommendation 150 and the generated pipeline object recommendation 148 to create the pipeline object 154.

Once the pipeline object 154 is generated, the workflow recommendation engine 152 may present the pipeline object 154 to a user. For example, the workflow recommendation engine 152 may present the pipeline object 154 to the user in the development environment 138. The workflow recommendation engine 152 may generate a plurality of pipeline objects. If the workflow recommendation engine 152 generates a plurality of pipeline objects, the user may have the option of selecting one of the plurality of pipeline object for use with the development project 156.

The CPU 162 and the memory 164 may implement one or more of the system 100's features, such as the development environment 138, the workflow analyzer 142, the workflow recommendation engine 152, the development project storage 102, 116, and the pipeline storage 130. For example, the memory 164 may store instructions which, when executed by the CPU 162, may perform one or more of the functions of the system 100. In some examples, the CPU 162 and the memory 164 may be implemented as physical hardware, and in other examples the CPU 162 and the memory 164 may be implemented as virtual hardware.

The system 100 may be implemented as one or more computer systems, which may include physical systems or virtual machines running Unix or Linux operating systems. For example, each of the development project storage 102, 116 may be implemented as a separate computer system. The pipeline storage 130 may also be a computer system. These computer systems may be networked, for example, the links between system components may be implemented by a network such as a local area network or the Internet. In other examples, the computer system 100 may be implemented as one or more virtual machines.

Figure 2:
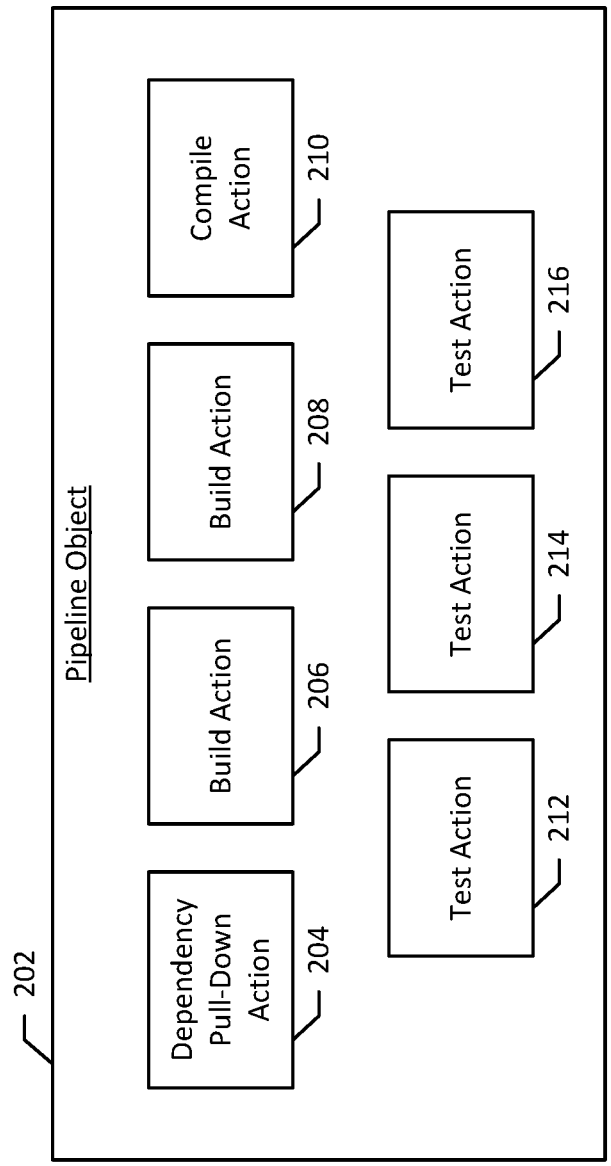
FIG. 2 illustrates a pipeline object according to an example embodiment of the present disclosure.

FIG. 2 depicts a pipeline object 202 according to an exemplary embodiment of the present disclosure. Pipeline object 202 may automate software development tasks, including dependency pull-down actions, build actions, compile actions, and test actions. The pipeline object 202 may be representative of the pipeline objects used in the system 100, such as pipeline objects 132, 136, the mapped pipeline object recommendation 150, the generated pipeline object recommendation 148, or the pipeline object 154.

Pipeline object 202 contains multiple pipeline actions, including a dependency pull-down action 204, build actions 206, 208, compile action 210, and test actions 212, 214, 216. Dependency pull-down actions 204 may include actions required to retrieve and implement the development project's dependencies. For example, a development project may depend on one or more Java libraries that need to be pulled down before the project can be compiled or tested. Build actions 206, 208 may include actions required to build one or more components of a development project. These build components may then be used later in executing or compiling the development project. For example, the build actions may include instructions to build a container file or an image file. Compile actions 210 may include actions required to compile the development project for execution in a runtime environment. Compile actions may incorporate one or more built objects with source code to create an executable capable of performing in a runtime environment. Test actions 212, 214, 216 may include actions required to test a compiled development project to ensure that the software development project is operating correctly. The test actions 212, 214, 216 may also ensure that the compiled development project integrates correctly with a runtime environment. For example, the test actions 212, 214, 216 may ensure that a development project's output is in the correct format or may ensure that the development project performed the expected function or returns the expected value. The test actions 212, 214, 216 may also include one or more unit tests in the code repository. The pipeline actions may be stored as script files that automatically execute the appropriate tests.

The pipeline object 202 may not execute these tests itself. Rather, in some examples, pipeline object 202 may store script files that are configured to cause the automatic execution of one or more pipeline actions. Further, although the pipeline object 202 is depicted as including a particular collection of pipeline actions, it should be understood that other examples may include different pipeline actions. For example, the pipeline object 202 may exclude the pipeline actions 204, 206, 208, and 210 and consist only of the test actions 212, 214, 216. The pipeline object 202 may also include entirely different pipeline actions not depicted in FIG. 2.

Figure 3:
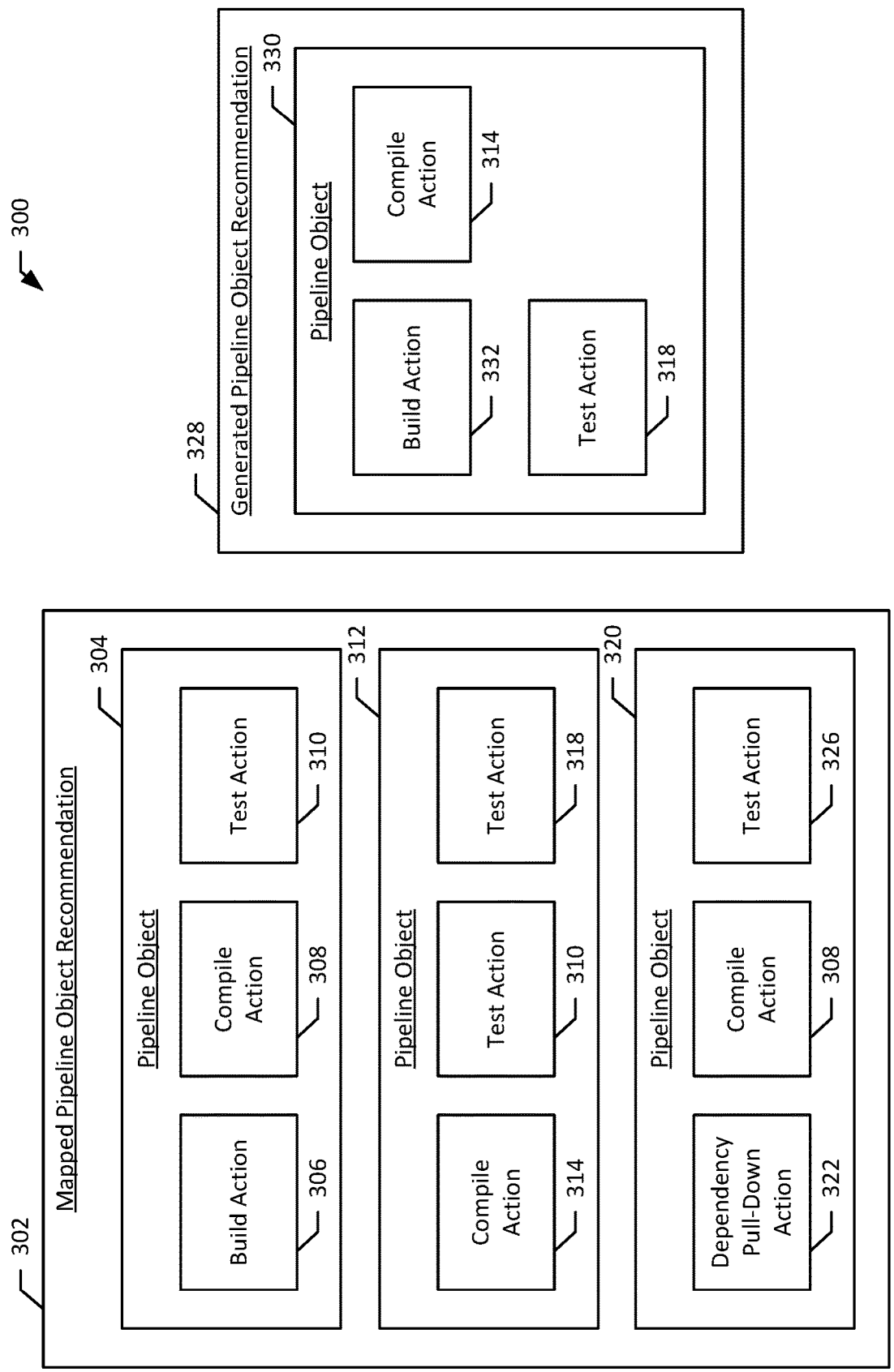
FIG. 3 illustrates a workflow analyzer output according to an example embodiment of the present disclosure.

FIG. 3 depicts a workflow analyzer output 300 according to an exemplary embodiment of the present disclosure. The workflow analyzer output 300 includes a mapped pipeline object recommendation 302 and a generated pipeline object recommendation 328. The mapped pipeline object recommendation 302 may be one example of the mapped pipeline object recommendation 150 generated by the software development project mapper 146. The mapped pipeline object recommendation 302 includes pipeline objects 304, 312, 320. Each of these pipeline objects 304, 312, 320 may correspond to a different development project stored in a development project storage. For example, pipeline object 304 may correspond to development project 104 and pipeline object 312 may correspond to development project 118. A pipeline object that corresponds to a particular development project may include pipeline actions corresponding to that development project.

Each of the pipeline objects 304, 312, 320 includes pipeline actions. For example, pipeline object 304 includes build action 306, compile action 308, and test action 310. Pipeline object 312 includes compile action 314, test action 310, and test action 318. Pipeline objects may also have one or more pipeline actions in common. In the preceding example, pipelines 304, 312 both include test action 310. Also, pipelines 304, 320 both include compile action 308.

The pipeline object may be selected from a pipeline storage 130 because the development project that the selected pipeline object corresponds to includes matching development attributes to the development project 156 that the recommendation is generated for. Thus, although not depicted in FIG. 1, the pipeline objects 304, 312, 320 may be stored in the pipeline storage 130. Also, because multiple development projects in the development project storages may have matching attributes with the development project 156, the mapped pipeline object recommendation 302 may include multiple pipeline objects 304, 312, 320 as depicted.

The generated pipeline object recommendation 328 may be one example of the generated pipeline object recommendation 148 generated by the workflow task analyzer 144. The generated pipeline object recommendation 328 includes a pipeline object 330. Although not depicted, the generated pipeline object recommendation 328 may include more than one pipeline object in certain configurations. The pipeline object 330 may be generated by the workflow task analyzer 144 based on monitored developer actions 140 from the development environment 138 to include pipeline actions derived from the monitored developer actions. For example, the development environment 138 may monitor a developer's actions and note that, when testing the software, the developer runs the same build action, compile action, and test action. The developer may build a container, compile an executable, and run tests in a runtime environment. The workflow task analyzer 144 may then determine that these actions should be included in a pipeline object corresponding to the development project 156 and generate the pipeline object 330 that includes build action 332, compile action 314, and test action 318. In some exemplary embodiments, the workflow task analyzer 144 may also use machine learning techniques to select the tasks to include in the generated pipeline object 330.

The workflow recommendation engine 152 may generate and present a pipeline object 154 based on both the mapped pipeline object recommendation 150, 302 and the generated pipeline object recommendation 148, 328. The workflow recommendation engine 152 may generate the pipeline object 154 in different ways depending on the quantity and quality of pipeline object recommendations 300 the workflow recommendation engine 152 receives.

If the workflow recommendation engine 152 receives both the mapped pipeline object recommendation 302 and the generated pipeline object recommendation 328, the workflow recommendation engine may use the generated pipeline object recommendation to select the best pipeline object contained in the mapped pipeline object recommendation 312. The workflow recommendation engine 152 may select the pipeline object in the mapped pipeline object recommendation 302 that shares the most actions with the pipeline object 330 of the generated pipeline object recommendation 328. For example, pipeline objects 330, 312 both include compile action 314 and test action 318. Therefore, the workflow recommendation engine 152 may select the pipeline object 312 to recommend to the developer. In this example, the workflow recommendation engine 152 may prioritize selecting from the mapped pipeline object recommendation 302 because the pipeline objects 304, 312, 320 may be pulled form the pipeline storage 130 and are thus already in use by other developers. This may provide more confidence in recommending a pipeline object to a developer because the recommended pipeline object is already being used.

Alternatively, if the workflow recommendation engine 152 receives both the mapped pipeline object recommendation 302 and the generated pipeline object recommendation 328, the workflow recommendation engine 152 may augment the closest pipeline object 312 to include additional pipeline actions from the generated pipeline object recommendation 328. For example, the workflow recommendation engine 152 may determine that the pipeline object 312 is the best mapped pipeline object as described above. But, instead of recommending pipeline object 312 on its own, the workflow recommendation engine 152 may generate a new pipeline object 154 that adds build action 332, which is included in the pipeline object 330 but not in the pipeline object 312. The newly-created pipeline object 154 then includes compile action 314, test actions 310, 318, and build action 332. In this implementation, the workflow recommendation engine 152 may be better able to customize the existing pipeline objects in the pipeline storage 130, making the recommendation more useful.

In some examples, the workflow recommendation engine 152 may determine that, based on the generated pipeline object recommendation 328, there are no good pipeline objects in the mapped pipeline object recommendation 302. In this case, the workflow recommendation engine 152 may recommend the pipeline object 330, as that is the best option remaining. For example, if the pipeline object 330 shared no similar actions with the pipeline objects 304, 312, 320, the workflow recommendation engine 152 may determine that none of the pipeline objects 304, 312, 320 should be recommended. Instead, the workflow recommendation engine 152 may recommend the pipeline object 330. In this configuration, the workflow recommendation engine 152 is able to respond to situations where the development project 156 is not similar enough to the projects in the development project storage 102, 116 to recommend or augment one of the corresponding pipelines in the pipeline storage 130.

In certain implementations, the workflow recommendation engine 152 may not receive both the mapped pipeline object recommendation 302 and the generated pipeline object recommendation 328. For example, the workflow recommendation engine 152 may receive the generated pipeline object recommendation 328 and not receive the mapped pipeline object recommendation 302. In this instance, the workflow recommendation engine 152 may recommend the pipeline object 330 in the generated pipeline object recommendation 328. In instances where there are multiple pipeline objects in the generated pipeline object recommendation 328, the workflow recommendation engine may present the multiple pipeline objects to the user or may select one of the pipeline objects using an alternative strategy, such as selecting the pipeline object with the most actions. In this configuration, the workflow recommendation engine 152 is still able to function and provide the user with a pipeline object 154 even though no mapped pipeline object recommendation 302 was received.

In another example, the workflow recommendation engine 152 may receive the mapped pipeline object recommendation 302 and not receive the generated pipeline object recommendation 328. In this instance, the workflow recommendation engine 152 may recommend the pipeline object in the mapped pipeline object recommendation 302 that corresponds to the development project with the most matching development attributes with the development project 156. For example, suppose the pipeline object 304 corresponds to the development project 104, the pipeline object 312 corresponds to the development project 118, and the pipeline object 320 corresponds to development project 120. The workflow recommendation engine may determine that development project 104 has two development attributes in common with development project 154 and that the other development projects 118, 120 have one and zero development attributes in common, respectively. In this example, because the development project 104 has the most development attributes in common with development project 156, the workflow recommendation engine may recommend the pipeline object 304 because the pipeline object 304 corresponds to development project 104. In this configuration, the workflow recommendation engine 152 is still able to function and provide the user with a pipeline object 154 even though no generated pipeline object recommendation 328 was received. Further, the workflow recommendation engine 152 is able to rely on various heuristics to prioritize and focus its recommendation to the user.

Although these strategies are discussed separately and occasionally in the context of particular configurations, it should be appreciated that certain implementations may combine one of more of these strategies. For example, the workflow recommendation engine 152 may use both the similarity of the pipeline object 304, 312, 320 with the pipeline object 330 and the number of matching development attributes with the development project 156 to select a pipeline object 304, 312, 320 from the mapped pipeline object recommendation 302 to present to the user. Such an implementation may be able to further augment the accuracy of the system's recommendations.

Figure 4:
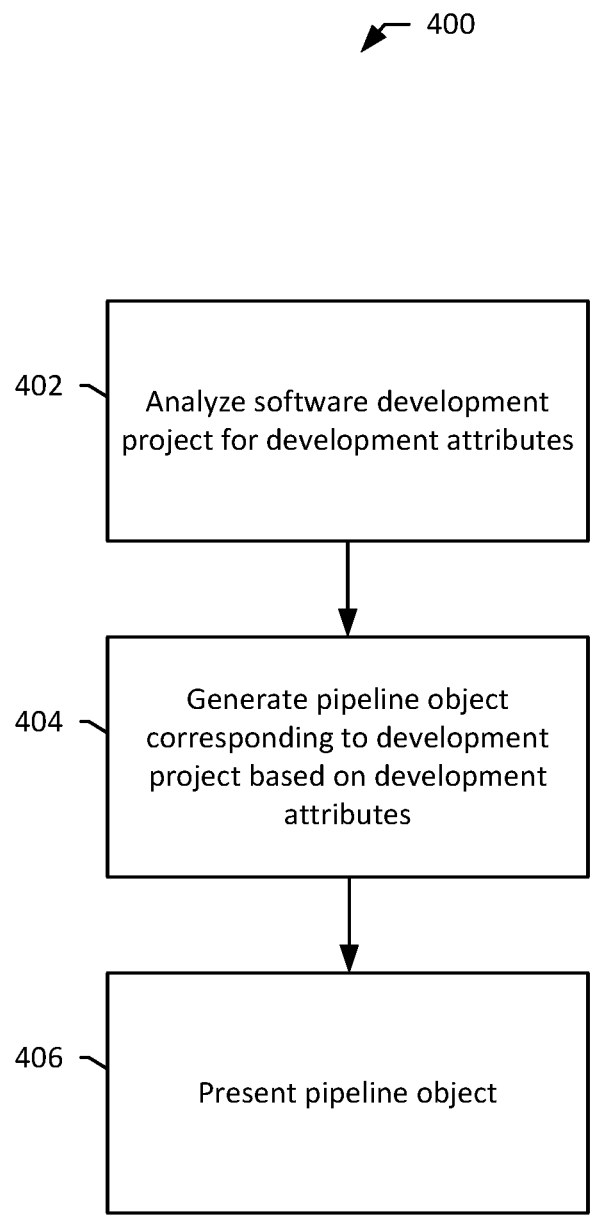
FIG. 4 illustrates a flowchart of an example method according to an example embodiment of the present disclosure.

FIG. 4 depicts a flowchart of an exemplary method 400 according to an example embodiment of the present disclosure. The method 400, when executed, may be used to generate and present recommended pipeline objects for development projects. The method 400 may be implemented on a computer system, such as the system 100. For example, the method 400 may be implemented by one or more of the workflow recommendation engine 152, the workflow analyzer 142, and the development environment. The method 400 may also be implemented by a set of instructions stored on a computer readable medium that, when executed by a processor, cause the computer system to perform the method. For example, all or part of the method 400 may be implemented by the CPU 162 and the memory 164. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin by analyzing a software development project for development attributes (block 402). The development attributes may include dependency pulldown actions, build actions, compile actions, test actions, development tools, programming languages, makefile similarities, source code managers, and associated employees, like the development attributes 108, 110, 112, 114. The development attributes may also include monitored development actions, such as monitored development actions 140 of development project 156. The development attributes may be received in the form of metadata relating to the development project, or by analyzing the development project for the attributes. For example, the source code manager and programming language may be determined by analyzing metadata relating to the project. In another example, determining project dependencies and makefile similarities may require analyzing the project itself. The development attributes may also be received by monitoring user behavior. For example, the development environment 138 may monitor the developer's behavior to collect the monitored developer actions 140.

The method 400 may then proceed with generating a pipeline object corresponding to the development project based on the development attributes (block 404). As discussed above, this generating the pipeline object may be performed in several ways. For example, generating the pipeline object may include identifying pipeline objects that correspond to development project with similar development attributes, which may be performed by the software development project mapper 146. The software development project mapper 146 may compare one or more development attributes, such as development attributes 158, 160 of development project 156, with the development attributes of development projects 104, 106, 118, 120 in the development project storage 102, 116. The software development project mapper 146 may then use statistical measures to determine which development projects 104, 106, 118, 120 have the most matching attributes to the development project 156. The software development project mapper 146 may then generate a mapped pipeline object recommendation 150 that includes the pipeline objects corresponding to the development projects 104, 106, 118, 120 with the most matching attributes. In some exemplary embodiments, the software development project mapper 146 may only include a subset of the pipeline objects, for example only the pipeline objects corresponding to the development project with the most matching attributes, or only the pipeline objects corresponding to the top three development projects with the most matching attributes.

Also, for example, generating the pipeline object may include generating the pipeline object by analyzing development actions, which may be performed by the workflow task analyzer 144, using monitored developer actions 140 from the development environment 138. The workflow task analyzer 144 may begin by identifying which of the monitored development actions 140 are regularly repeated in the development process. The repeated tasks may then be grouped based on the type of task that they are. For example, build tasks may be grouped together and test tasks may be grouped together. The workflow task analyzer 144 may then generate pipeline actions based on the grouped tasks. For example, one or more build actions may be generated based on the grouped build tasks and one or more test actions may be generated based on the grouped test tasks. The workflow task analyzer 144 may generate the pipeline actions in several ways. A database of previously-used pipeline actions may be used, and the pipeline actions may be generated by selecting the actions that most closely resemble the grouped tasks. Alternatively, the workflow task analyzer may generate the pipeline actions based on the commands that the user runs in order to perform the grouped tasks.

Although discussed separately, it should be appreciated that these methods can be used both separately and in combination, as discussed in greater detail above in regards to FIG. 3.

The method 400 may then proceed with presenting the pipeline object (block 406). This may occur by sending an alert to the user that a new pipeline object recommendation is ready for their review. For example, the alert may be presented to the user in the development environment 138, such as the Eclipse IDE. This may also occur by adding the pipeline object to the development project's source directory for easy deployment by the user later in the development process.

Figure 5:
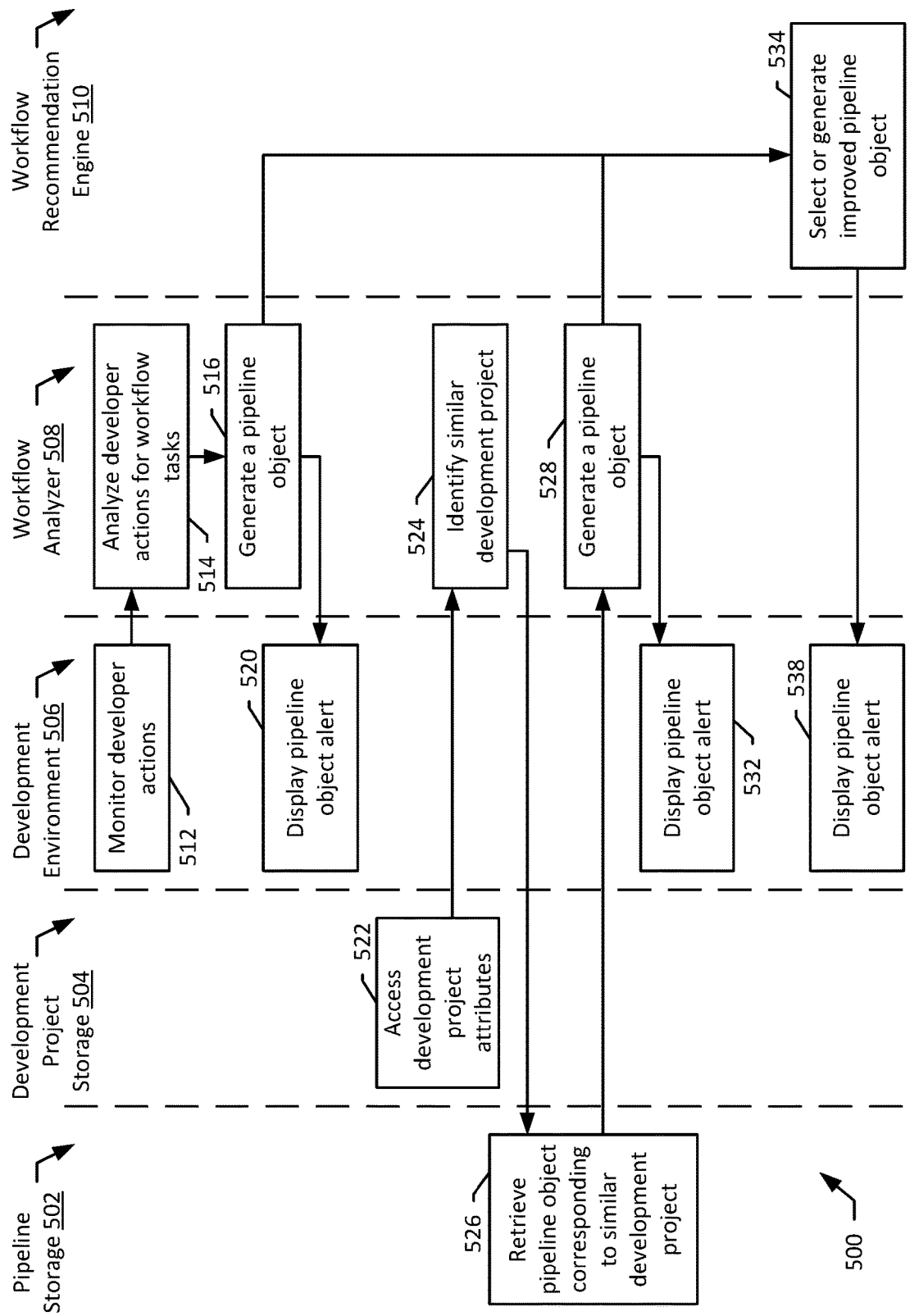
FIG. 5 illustrates a flow diagram of an example method according to an example embodiment of the present disclosure.

FIG. 5 depicts a flow diagram of an example method 500 according to an example embodiment of the present disclosure. The method 500 may be used to generate and present recommended pipeline objects for development projects. The method 500 may be implemented on a computer system, such as the system 100. For example, the pipeline storage 502 may be implemented by the pipeline storage 130, the development project storage 504 may be implemented by the development project storages 102, 116, the development environment 506 may be implemented by the development environment 138, the workflow analyzer 508 may be implemented by the workflow analyzer 142, and the workflow recommendation engine 510 may be implemented by the workflow recommendation engine 152. The method 500 may also be implemented all or in part by a set of instruction stored on a computer readable medium that, when executed by a processor, cause the computer system to perform the method. For example, all or part of the method 500 may be implemented by the CPU 162 and the memory 164. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 begins with the development environment 506 monitoring the developer's actions (block 512). The development environment 506 may monitor the developer's actions and record monitored developer actions, such as the monitored developer actions 140. The monitored developer actions may include one or more repeated development tasks that can be automated as a pipeline action.

The method 500 then proceeds to analyze the monitored developer actions for workflow tasks (block 514). The workflow analyzer 508 may analyze the developer actions as discussed above in connection with the workflow task analyzer 144. For example, the workflow analyzer 508 may identify repeated developer tasks and group them according to the type of action being performed. The workflow analyzer 508 then generates a pipeline object (block 516). The workflow analyzer 508 may generate the pipeline object based the grouped developer tasks. These tasks may be converted into pipeline actions and grouped together to form a pipeline object associated with the development project.

The development environment 506 may then proceed to display a pipeline object alert to the user (block 520). For example, the user may receive an alert indicating that a new pipeline object has been generated corresponding to the development project. Alternatively, from block 516, the method 500 may proceed to select or generate an improved workflow recommendation (block 534). This will be discussed in greater detail below.

In a second example, the method 500 begins with the development project storage 504 accessing the development project's development attributes (block 522). The development attributes may include any aspect of the development project, including its development environment, library dependencies, programming languages, or any other attribute discussed above in connection with development attributes 108, 110, 112, 114. The development attributes may be stored in the development project storage 504 or the development environment 506 as metadata corresponding to the project. Alternatively, some of the development attributes may be extracted by the workflow analyzer 508 analyzing the development project's files. Thus, although block 522 is depicted in the development project storage 504, block 522 may also be implemented by the development environment 506 and the workflow analyzer 508.

Next, the workflow analyzer 508 identifies similar development projects (block 524). The similar development projects may be identified by comparing the development attributes of development projects in the development project storage with the development attributes of the development project in the development environment, such as development project 156. The workflow analyzer 508 may then select the development projects with matching attributes as the similar development projects. The workflow analyzer 508 may select more than one similar development project. Once the similar development projects are identified, the pipeline objects corresponding to the similar development projects are retrieved from the pipeline storage (block 526).

The workflow analyzer 508 then generates a pipeline object based on the pipeline objects corresponding to the similar development projects (block 528). As discussed above, the pipeline object may be generated by selecting the pipeline object corresponding to the similar development project with the most matching attributes. Then the development environment 506 proceeds to display a pipeline object alert to the user (block 532). For example, the user may receive an alert via a graphical user interface indicating that a new pipeline object has been generated corresponding to the development project.

Alternatively, from block 528, the method 500 may proceed to select or generate an improved workflow recommendation (block 534). Here, the workflow recommendation engine 510 may receive pipeline objects from both blocks 516 and 528. To generate the improved pipeline object, the workflow recommendation engine 508 may process the received pipeline objects as described above in connection with FIGS. 3 and 4. For example, the workflow recommendation engine may compare the pipeline object generated at block 516 based on the monitored developer actions with the pipeline objects generated at block 528 based on the similar development projects. The workflow recommendation engine may select the pipeline object received from block 528 that most closely resembles the pipeline object received from block 516. Then the development environment 506 proceeds to display a pipeline object alert to the user, as discussed above (block 538).

FIG. 6 depicts a block diagram of an example system 600 according to an example embodiment of the present disclosure. The system 600 includes a processor 602 and a memory 604 communicatively coupled to the processor 602. The memory 604 may contain instructions 614 that, when executed by the processor 602, cause the processor 602 to analyze a software development project 606 for a plurality of development attributes 608, 610. The instructions 614, when executed by the processor 602, may also cause the processor 602 to generate a pipeline object 612 corresponding to the software development project 606 based on the plurality of development attributes 608, 610, and then present the pipeline object 612.

As evidenced in the method 500 and in other examples discussed throughout the present disclosure, the present systems and methods enable the automatic generation of pipeline object recommendations for development projects. The present system and methods thus replaces workflows that were previously created based on subjective developer decisions with workflows that are created based on objective, computer-based recommendations derived from either developer actions or workflows. This is accomplished through the improved set of rules used to generate objectively-defined workflow recommendations. Monitoring developer actions and identifying similar development projects based on development attributes as described herein are both new methods of generating workflow recommendations. Further, the methods and systems described in the present disclosure enable the use of an improved pipeline object recommendation as recited in the claims.

The presently disclosed improved computer software development environment creates several significant improvements for development projects. The improved pipeline object recommendation can effectively act as a profile that enhances computer security and performance in operation. For example, by making pipeline objects easier to implement, security and consistency are both improved as more testing is automated for developers and thus performed more regularly and consistently. Also, because workflows may be shared across projects, consistency in development tasks like project builds and tests will improve as these practices are shared between projects. Further, compatibility may be improved and the computer hardware running the development projects may perform better because the software will be properly tested and will thus fail less.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system comprising:
a development project storage configured to store a plurality of software development projects each having respective development attributes;
a processor; and
a memory communicatively coupled to the processor containing instructions that, when executed by the processor, cause the processor to:
analyze a software development project to determine a plurality of development attributes of the software development project;
compare the determined plurality of development attributes of the software development project to the development attributes of the stored plurality of software development projects in the development project storage;
identify a stored software development project having matching development attributes with the software development project;
generate a pipeline object that automates at least one software development task, the pipeline object corresponding to the software development project, based on the identified stored software development project; and
present the pipeline object.

2. The system of claim 1, wherein the memory contains further instructions that, when executed by the processor, cause the processor to:
provide an integrated development environment;
monitor development actions corresponding to the software development project with the integrated development environment; and
analyze the development actions to identify pipeline actions.

3. The system of claim 2, wherein the memory contains further instructions that, when executed by the processor, cause the processor to:
convert the pipeline actions into the pipeline object capable of automated execution.

4. The system of claim 1, wherein the matching development attributes include one or more of dependency pull-down actions, build actions, compile actions, test actions, development tools, programming languages, makefile similarities, source code managers, and associated employees.

5. The system of claim 1, wherein the memory contains further instructions that, when executed by the processor, cause the processor to:
generate the pipeline object corresponding to the software development project based on a second pipeline object associated with the identified stored software development project having matching development attributes.

6. The system of claim 1, wherein the software development project is stored in the development project storage.

7. The system of claim 1, further comprising:
a pipeline object storage configured to store a plurality of pipeline objects for use in software development projects.

8. The system of claim 1, wherein the pipeline object contains pipeline actions that automate software development tasks.

9. The system of claim 1, wherein the at least one software development task includes one or more of dependency pull-down actions, build actions, compile actions, and test actions.

10. A method comprising
analyzing a software development project to determine a plurality of development attributes of the software development project;
comparing the determined plurality of development attributes of the software development project to respective development attributes of a plurality of software development projects stored in a development project storage;
identifying a stored software development project having matching development attributes with the software development project;
generating a pipeline object that automates at least one software development task, the pipeline object corresponding to the software development project, based on the identified stored software development project; and
presenting the pipeline object.

11. The method of claim 10, wherein analyzing the software development project further comprises:
monitoring development actions corresponding to the software development project; and
analyzing the development actions to identify pipeline actions.

12. The method of claim 11, wherein generating the pipeline object further comprises:
converting the pipeline actions into the pipeline object capable of automated execution.

13. The method of claim 10, wherein the matching development attributes include one or more of dependency pull-down actions, build actions, compile actions, test actions, development tools, programming languages, makefile similarities, source code managers, and associated employees.

14. The method of claim 10, further comprising:
generating the pipeline object corresponding to the software development project based on a second pipeline object associated with the identified stored software development project having matching development attributes.

15. The method of claim 10, wherein identifying the software development project having matching development attributes further comprises:
selecting the stored software development project having matching development attributes from a repository containing the development project.

16. The method of claim 10, wherein the pipeline object contains pipeline actions that automate software development tasks.

17. The method of claim 10, wherein the at least one software development task includes one or more of dependency pull down actions, build actions, compile actions, and test actions.

18. A non-transitory computer readable medium storing instructions which, when executed by one or more processors, cause the one or more processors to:
analyze a software development project to determine a development attribute of the software development project;
compare the determined plurality of development attributes of the software development project to respective development attributes of a plurality of software development projects stored in a development project storage;
identify a stored software development project having matching development attributes with the software development project;
generate a pipeline object that automates at least one software development task, the pipeline object corresponding to the development project, based on the identified stored software development project; and present the pipeline object.

19. The system of claim 2, wherein generating the pipeline object is further based on the identified pipeline actions.

* * * * *